United States Patent [19]
Nishikawa et al.

[11] Patent Number: 5,492,957
[45] Date of Patent: Feb. 20, 1996

[54] FACE COAT COMPOSITION FOR CASTING MOLD AND METHOD FOR THE PREPARATION OF CASTING MOLD HAVING FACE COAT LAYER

[75] Inventors: Koji Nishikawa, Chiba; Hiroaki Toda, Okayama; Ken-ichiro Suzuki, Chiba; Yuji Kimura; Norifumi Yoshida, both of Fukui, all of Japan

[73] Assignee: Shin-Etsu Chemical Co., Ltd., Tokyo, Japan

[21] Appl. No.: 121,061

[22] Filed: Sep. 14, 1993

[51] Int. Cl.$^6$ ................ C08J 5/10; C08K 3/18; C08K 3/22; C08L 23/00
[52] U.S. Cl. .............. 524/430; 524/431; 524/432; 524/433; 524/434; 524/435; 524/436; 524/494
[58] Field of Search .................. 524/430, 431, 524/432, 433, 434, 435, 436, 494

[56] References Cited

U.S. PATENT DOCUMENTS 4,787,439 11/1988 Feagin ........................... 164/518
4,947,927 8/1990 Horton ........................... 164/517

FOREIGN PATENT DOCUMENTS 05161938A 6/1993 Japan.

Primary Examiner—Paul R. Michl
Assistant Examiner—U. K. Rajguru
Attorney, Agent, or Firm—McAulay Fisher Nissen Goldberg & Kiel

[57] ABSTRACT

Proposed is a novel face coat composition having improved stability used in the preparation of a shell-like casting mold for a high melting point metal or alloy by the lost-wax mold method by forming a face coat layer on a wax model using the composition and further forming a backup coat layer thereon followed by removal of the wax by melting and calcination of the shell-like mold formed from the layers. The face coat composition comprises a rare earth oxide powder as the refractory constituent and a binder which is a synthetic resin in the form of an aqueous emulsion, a water-soluble organic polymer in the form of an aqueous solution, a sol of an inorganic oxide such as aluminum oxide, silicon dioxide and zirconium oxide or a combination thereof. A small amount of a powder of rare earth glass can be admixed to the composition so that the face coat layer formed from the face coat composition may have still improved properties. The face coat layer formed from the inventive face coat composition is outstandingly resistant against attack of the high-temperature melt of a reactive metal or alloy so as not to form a reaction-hardened surface layer on the cast body.

10 Claims, 1 Drawing Sheet

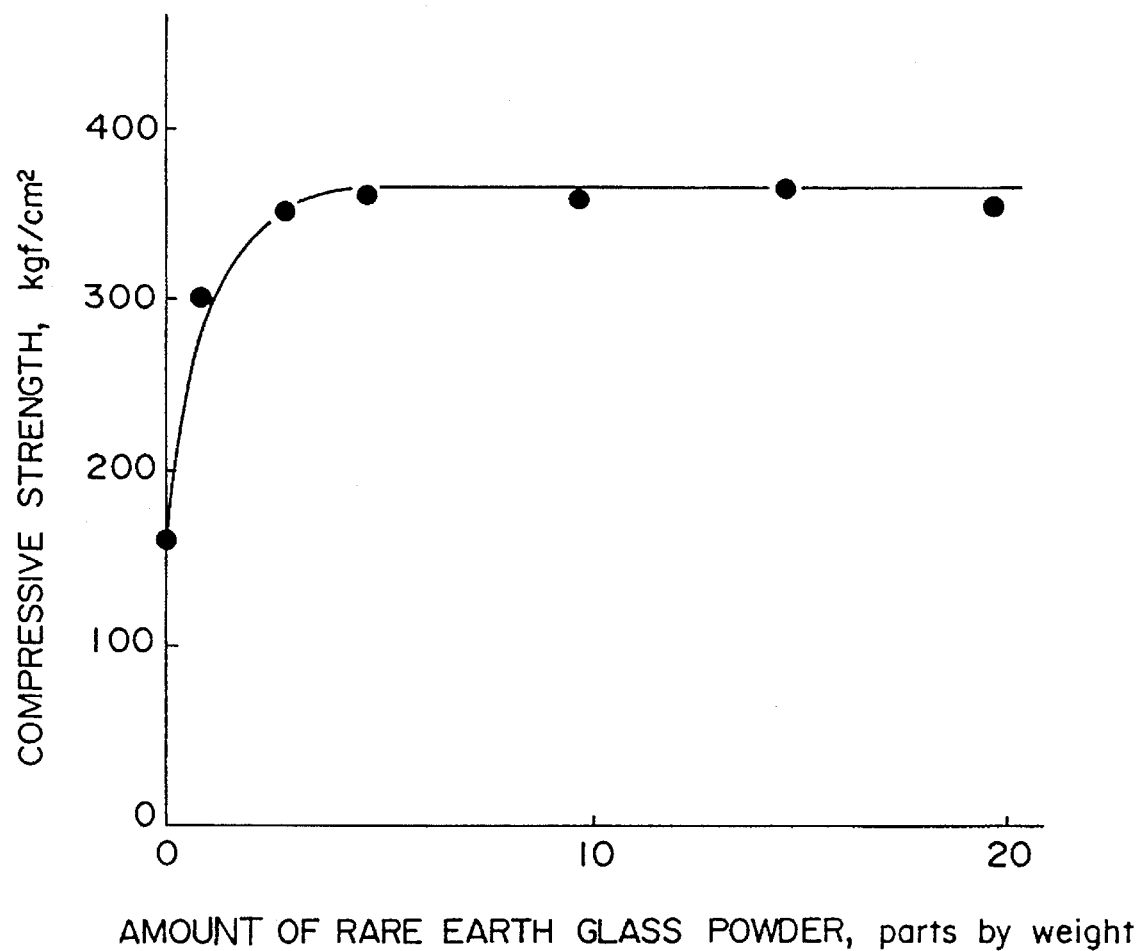
FIGURE

FACE COAT COMPOSITION FOR CASTING MOLD AND METHOD FOR THE PREPARATION OF CASTING MOLD HAVING FACE COAT LAYER

BACKGROUND OF THE INVENTION

The present invention relates to a novel face coat composition for a mold for casting of a metal having a relatively high melting point as well as to a method for forming a face coat layer of a casting mold.

A lost-wax mold for casting of a metal or alloy having a relatively high melting point such as titanium and titanium-based alloys has a layered structure consisting of a so-called face coat layer on the surface of the mold cavity coming into contact with the melt and a backup coat layer by which the general configuration of the mold is formed with reinforcement as a backup of the face coat layer. A face coat layer of a casting mold is formed by coating a wax-made model of the desired cast body with a slurried composition containing a refractory material to form a layer followed by drying and formation of the backup coat layer thereon, removal of the wax by melting under heating and finally calcination of the double-layered casting mold.

It is desirable that the material for the face coat layer coming into contact with the high temperature melt in the course of casting is as highly refractory as possible. Conventional refractory materials used as a material of such a face coat include high melting-point metals such as tungsten and molybdenum and oxides such as zirconium oxide, calcium oxide and the like. Use of a high melting-point metal as the refractory material in the face coat composition is accompanied by an industrially difficult problem that, since hydrogen reduction must be undertaken in the firing step of the mold before casting, large-scale facilities are required for the preparation of the casting mold if not to mention the complicacy of the control of the process. When zirconium oxide is used as the face coat material among oxides used for the purpose, a problem must be solved that zirconium oxide has reactivity with melts of certain metals to form a reaction-hardened layer on the surface of the cast body which must be removed by taking a large amount of labor and time in order to finish the cast article which eventually cannot have a good dimensional accuracy as a consequence. Calcium oxide as a material of the face coat layer has a problem that calcium oxide is highly hygroscopic so that difficulties are encountered in the preparation of the casting mold and subsequent handling thereof.

Alternatively, a proposal has been made, for example, by D. R. Schulyer et al. in Proceedings of Vacuum Metallurgy Conference, edited by R. C. Krutenat, pages 475–503 (1977) for the use of yttrium oxide which is little reactive with a high melting-point, active metal or alloy such as certain titanium-based alloys by using an aqueous colloidal liquid of potassium silicate with fine particles of yttrium oxide dispersed therein with further admixture of relatively coarse particles of yttrium oxide in the formation of a face coat layer of a casting mold. As is reported by Schulyer, however the face coat layer thus formed by using the above mentioned face coat composition has a surface not smooth enough as compared with the conventional face-coated molds prepared by the workmanship of an ordinary level having air bubbles and pits as well as many stucco particles appearing from part to part.

Further, Japanese Patent Kokai No. 62-143864 discloses a face coat composition which is an aqueous slurry by using a yttrium oxide sol as a binder. This patent document also mentions on the use of a zirconium oxide sol instead of the yttrium oxide sol. According to the results of the evaluation tests given there, the face-coated casting molds prepared by using such a face coat composition could be highly evaluated with a relatively small thickness of the reaction-hardened layer on the surface of the cast bodies prepared by using the mold. A problem in this method, however, is that the stability of the face coat composition in the form of a slurry is questionable because yttrium oxide sols are inherently unstable.

Japanese Patent Kokai No. 63-115644, on the other hand, discloses a face coat composition in the form of a slurry containing yttrium oxide with alcohol as the dispersing medium and a partial hydrolyzate of ethyl silicate as the binder. A comparison of this face coat composition is given there with a similar composition prepared by using water as the dispersing medium in place of the alcohol. According to this patent document, the face coat composition is acceptable in respect of the relatively small thickness of the reaction-hardened layer on the surface of the cast bodies prepared by using a mold having a face coat layer thereof. This advantage, in fact, could be confirmed by the inventors' experiments repeating the disclosure. A serious problem in this method, however, is also the instability of the face coat composition. Namely, the slurried face coat composition has an unduly short pot life not suitable for practical use. For example, coagulation of the slurried face coat composition proceeds already within 12 hours from preparation when the weight proportion of the yttrium oxide in the composition to the silicon dioxide exceeds 7.5% and within a few days even when the proportion is lower than that.

Further, when a mold prepared from the above described face coat composition is used for casting of a high melting-point, active metal such as titanium or a titanium-based alloy, the silicon dioxide constituent in the slurry of the face coat composition reacts with the melt of the metal or alloy under casting so as to form a hard but brittle reaction-hardened layer, which must be removed to finish the cast body by chemical milling and grinding or polishing unavoidably resulting in a decreased dimensional accuracy of the cast body.

In addition to the above described problems, following problems are involved in the use of yttrium oxide as a refractory constituent in the face coat composition.

It is necessary in the use of yttrium oxide, namely, that the temperature of calcination or firing of the casting mold must be increased to 1600° C. or higher in order to impart the mold with a strength capable of withstanding the attack of the flow of the melt which otherwise destroys or deforms the mold while the refractory materials such as zircon- or mullite-based ones usually used as the material of the backup coat have such refractoriness as not to withstand a temperature of firing of the mold exceeding 1100° C. so that, when firing of the mold is conducted at an excessively high temperature, the refractory material of the backup coat layer is subject to softening and the mold is eventually broken. Accordingly, the use of yttrium oxide as the refractory constituent in the face coat composition is not in compliance with the use of a zircon- or mullite-based refractory material for the backup coat layer.

On the other hand, a proposal is made in Japanese Patent Kokai No. 3-8534 for the use of an aqueous slurry containing yttrium oxide which is admixed with a water-soluble organic polymer as the binder but the green strength of the face coat layer formed therefrom is so low that, in the step of dewaxing as one of the steps in the lost-wax casting method, the face coat layer is eventually destroyed by being lost with the molten wax.

SUMMARY OF THE INVENTION

One of the objects of the present invention is accordingly to provide a face coat composition used in the preparation of a mold for casting of a high melting-point metal, which is capable of giving a face coat layer having a sufficiently high green strength and capable of giving a cast body by the lost-wax casting method having high dimensional accuracy and having no reaction-hardened layer on the surface.

A second object of the present invention is then to provide a face coat composition of a casting mold having a long pot life, with which a cast body having an excellent surface condition without rough surface can be prepared by casting.

A third object of the present invention is to provide a novel face coat composition capable of giving a face coat layer having a high strength even when the firing temperature is relatively low.

Thus, the face coat composition for a casting mold of the present invention comprises, as a blend in the form of an aqueous slurry, an aqueous emulsion of a synthetic resin and a powder of an oxide of a rare earth element uniformly dispersed in the aqueous emulsion, the amount of the aqueous emulsion of a synthetic resin being in the range from 0.1 to 10 parts by weight calculated as solid per 100 parts by weight of the rare earth oxide powder.

In a second embodiment of the invention, the face coat composition of the invention comprises, as a blend in the form of an aqueous slurry, a rare earth oxide powder, a rare earth glass powder and an aqueous emulsion of a synthetic resin, the amount of the rare earth glass powder being in the range from 1 to 15 parts by weight per 100 parts by weight of the rare earth oxide powder.

In a third embodiment of the invention, the face coat composition of the present invention comprises, as a blend in the form of an aqueous slurry, a rare earth oxide powder, a rare earth glass powder and an aqueous solution of a water-soluble organic polymeric compound, the amount of the rare earth glass powder being in the range from 1 to 15 parts by weight per 1 parts by weight of the rare earth oxide powder.

In a fourth embodiment of the invention, the face coat composition of the present invention comprises, as a blend in the form of an aqueous slurry, a rare earth oxide powder, a rare earth glass powder, an aqueous emulsion of a synthetic resin and a water-soluble organic polymeric compound, the amount of the rare earth glass powder being in the range from 1 to 15 parts by weight per 100 parts by weight of the rare earth oxide powder.

In a fifth embodiment of the invention, the face coat composition of the present invention comprises, as a blend in the form of an aqueous slurry, a rare earth oxide powder, a rare earth glass powder and an aqueous sol of silicon dioxide, zirconium oxide or yttrium oxide, the amount of the rare earth glass powder being in the range from 1 to 15 parts by weight per 100 parts by weight of the rare earth oxide powder.

In a sixth embodiment of the invention, the face coat composition of the present invention comprises, as a blend in the form of an aqueous slurry, a rare earth oxide powder, a rare earth glass powder, an aqueous emulsion of a synthetic resin or an aqueous solution of a water-soluble organic polymeric compound and an aqueous eous sol of silicon dioxide, zirconium oxide or yttrium oxide, the amount of the rare earth glass powder being in the range from 1 to 15 parts by weight per 100 parts by weight of the rare earth oxide powder.

BRIEF DESCRIPTION OF THE DRAWING

The FIGURE is a graph showing the compressive strength of pellets prepared from mixtures of yttrium oxide and varied amounts of a rare earth glass powder as a function of the amount of the rare earth oxide powder added to yttrium oxide.

DETAILED DESCRIPTION OF THE PREFERRED EMBODIMENTS

One of the essential ingredients in the inventive face coat composition is a powder of a rare earth oxide while, basically, the inventive face coat composition essentially comprises a rare earth oxide powder and a binder constituent. The rare earth element forming the oxide include scandium, yttrium and the elements having an atomic number of 57 to 71 inclusive. The oxides of these rare earth elements can be used either singly or as a combination of two kinds or more according to need. The particle size distribution of the rare earth oxide powder is not particularly limitative but, in order to obtain a sufficiently high strength of the mold after firing, it is preferable that the rare earth oxide powder has such a particle size distribution that the weight fraction of the particles having a particle diameter not exceeding 2 μm is in the range from 30 to 100% or, more preferably, the weight fractions of the particles having a particle diameter not exceeding 2 μm, in the range from 2 to 5 μm and exceeding 5 μm are in the ranges from 50 to 90%, from 0 to 40% and from 10 to 50%, respectively.

As to the second essential ingredient in the inventive face coat composition, i.e. the binder constituent, the scope of the invention consists, on one hand, in the use of an aqueous emulsion of a synthetic resin as the binder and, on the other hand, in the use of a rare earth oxide powder, which serves as a sintering aid, in combination with a binder which may be organic or inorganic.

The aqueous emulsion of a synthetic resin, which serves as a binder for the rare earth oxide particles, is a dispersion of the synthetic resin particles in the oil-in-water type with a non-ionic or anionic surface active agent as the emulsifying agent. Examples of the synthetic resin as the dispersed phase in the aqueous emulsion include homopolymers and copolymers of various kinds of ethylenic monomers such as ethylene, styrene, acrylic acid esters, methacrylic acid esters, acrylonitrile, vinyl acetate and the like, silicone resins, waxes and so on. These polymeric compounds can be used either singly or as a combination of two kinds or more according to need assuming good compatibility therebetween.

Examples of the non-ionic surface active agent as the emulsifying agent include sorbitan monolaurate, polyxyethylene stearyl ethers, polyxyethylene nonylphenyl ethers and the like while the anionic surface active agent is exemplified typically by sodium laurate and the like. It is preferable to use an aqueous emulsion of a synthetic resin containing at least 0.5% by weight of the emulsifying agent, i.e. non-ionic or anionic surface active agents.

The aqueous emulsion of the synthetic resin plays a role to keep the stability of the aqueous slurry as an ingredient of the face coat composition by improving the dispersibility of the rare earth oxide powder along with an effect of improving the green strength of the green face coat layer formed from the face coat composition comprising the essential and optional ingredients. It is usual that an aqueous emulsion of a synthetic resin having a high content of the dispersed phase is prepared and used after dilution with water so as to have an appropriate solid content suitable for use in the inventive face coat composition although it is optional that the above mentioned monomer or monomers are emulsion-polymerized in an aqueous medium to give an aqueous emulsion of an adequate solid content as prepared.

Though not particularly limitative, the content of the rare earth oxide powder in the inventive face coat composition in the form of an aqueous slurry is preferably in the range from 40 to 90% by weight or, more preferably, in the range from 55 to 85% by weight. When the amount of the rare earth oxide powder in the composition is too small, the green face coat layer of the mold after drying is sometimes subject to formation of cracks while, when the amount thereof is too large, on the other hand, a slurried composition can hardly be obtained or, even when an aqueous slurry could ever be obtained, the consistency of the slurry would be unduly high so that a difficulty is encountered in the formation of a face coat layer of the mold having an appropriate thickness by using the face coat composition.

The amount of the synthetic resin in the form of an aqueous slurry in the inventive face coat composition is usually in the range from 0.1 to 10 parts by weight or, preferably, from 1 to 5 parts by weight per 100 parts by weight of the rare earth oxide powder in order to fully exhibit the effect as a binder of the rare earth oxide particles so as to ensure high strengths of the green face coat layer. Alternatively, the amount of the synthetic resin in the form of an aqueous emulsion in the inventive face coat composition is in the range from 0.1 to 9% by weight or, preferably, from 1 to 4.5% by weight based on the total amount of the face coat composition including water as the medium in order to ensure appropriate rheological properties of the slurry for use as a face coat composition.

The face coat composition of the present invention according to the first embodiment can be prepared, for example, by the portionwise introduction of a specified amount of a fine powder of the rare earth oxide having an appropriately controlled particle size distribution into the aqueous emulsion of a synthetic resin or by admixing the rare earth oxide powder with the aqueous emulsion of the synthetic resin to give an aqueous slurry of a desired solid content which is then thoroughly milled in a ball mill, machine mortar and the like until aggregates of the rare earth oxide particles can no longer be found in the slurry. It is preferable according to need, in order to prevent inclusion of air bubbles in the slurry, that the milling work of the slurry is conducted with addition of a defoaming agent, such as those based on silicones, polyoxyethylene-polyoxypropylene copolymers and the like, in an amount, for example, in the range from 0.01 to 1.0 part by weight per 100 parts by weight of the rare earth oxide powder. The thus prepared face coat composition is a slurried mixture consisting of an aqueous medium as the continuous phase and the particles of the rare earth oxide and particles of the synthetic resin as the dispersed phases in the aqueous medium.

In the second embodiment of the invention, the face coat composition of the invention comprises, in addition to the rare earth oxide powder and the aqueous emulsion of a synthetic resin which are essential in the first embodiment of the invention, a small amount of a rare earth glass powder. The additional admixture of a rare earth glass powder in the inventive face coat composition has an effect that the strength of the mold after firing can be greatly improved so that a quite satisfactory lost-wax mold for casting of a high melting-point metal or alloy can be prepared with the face coat composition even when the firing temperature of the mold is relatively low.

The rare earth glass suitable for use here has a chemical composition represented by the composition formula

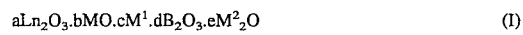

$$a\text{Ln}_2\text{O}_3 \cdot b\text{MO} \cdot c\text{M}^1 \cdot d\text{B}_2\text{O}_3 \cdot e\text{M}^2{}_2\text{O} \qquad (I)$$

in which Ln is an element selected from the group consisting of yttrium and lanthanide elements, i.e. elements having an atomic number of 57 to 71 inclusive, M is a divalent metallic element selected from the group consisting of magnesium, calcium, strontium, barium and zinc, $M^1$ is an oxide selected from the group consisting of aluminum oxide $Al_2O_3$, silicon dioxide $SiO_2$ and antimony oxide $Sb_2O_3$, $M^2$ is an alkali metal element selected from the group consisting of lithium, sodium and potassium, the subscript a is a positive number in the range from 0.01 to 0.30, the subscript b is zero or a positive number not exceeding 0.60, the subscript c is zero or a positive number not exceeding 0.20, the subscript d is a positive number in the range from 0.30 to 0.80 and the subscript e is zero or a positive number not exceeding 0.15 with the proviso that a+b+c+d+e is equal to 1 and b+c does not exceed 0.60. The rare earth glass is used in the form of a powder of which the average particle diameter is preferably in the range from 1 to 50 μm.

When the value of the subscript a is too small, the rare earth glass would be subject to an increase in decomposition or dissolution in water, referred to hereinafter as water-solubility, which is quite small when the value of a is 0.03 or larger. When the value of the subscript a is too large, on the other hand, the softening point of the rare earth glass powder would be unduly high to cause a problem in the formation of a face coat layer with the face coat composition. In this regard, the value of a is preferably in the range from 0.03 to 0.20.

The divalent metallic element denoted by M in the composition formula (I) is preferably zinc, magnesium or calcium. Strontium and barium are less preferable because of the somewhat larger water-solubility of the rare earth glass powder. In this regard, the value of the subscript b should not exceed 0.40 or, preferably, 0.30 when strontium is used as the element M and should not exceed 0.40 or, preferably, 0.20 when barium is used as the element M. When the value of the subscript b is larger than 0.60, difficulties are caused in the vitrification of the blend of the ingredient oxides. In this regard, it is preferable that the value of b does not exceed 0.50.

The oxide represented by the symbol $M^1$ is selected from aluminum oxide, silicon dioxide and antimony oxide, of which antimony oxide has an effect to decrease the softening point of the rare earth glass while aluminum oxide and silicon dioxide have an effect to decrease the water-solubility of the rare earth glass though with some increase in the softening point. Accordingly, aluminum oxide and silicon dioxide are preferred as the oxide $M^1$ when a decrease is expected in the water-solubility of the rare earth glass powder by the use of barium or strontium as the divalent metallic element M. The value of the subscript c preferably should not exceed 0.10.

The value of the subscript d, which defines the molar fraction of boron oxide constituent $B_2O_3$ in the rare earth glass, is in the range from 0.30 to 0.80 or, preferably, in the range from 0.40 to 0.70.

The constituent represented by $M^2{}_2O$ in which $M^2$ is an alkali metal element selected from lithium, sodium and potassium, has an effect of decreasing the softening point of the rare earth glass even with a very small amount although the effect can be remarkable when the value of the subscript e is 0.01 or larger. When the value of the subscript e is too large, however, a significant reaction may take place between the face coat layer and the melt of the high temperature-melting point metal or alloy such as titanium and titanium-based alloys. In this regard, the value of the subscript e is preferably in the range from 0.01 to 0.15.

The amount of the rare earth glass powder in the inventive face coat composition is in the range from 1 to 15 parts by weight or, preferably, from 1 to 5 parts by weight per 100 parts by weight of the rare earth oxide powder in order to exhibit the effect of improving the strength of the mold after firing still with negligibly low reactivity between the melt of the metal or alloy and the face coat layer due to the presence of the rare earth glass therein.

As to the aqueous emulsion of a synthetic resin in the face coat composition of the invention according to the second embodiment, the types of the synthetic resin and the amount thereof in the face coat composition can be about the same as in the first embodiment. The preparation procedure of the composition is also the same as in the first embodiment excepting for the further admixture of a rare earth glass powder which can be added portion-wise to the aqueous emulsion of the synthetic resin together with the rare earth oxide powder.

As compared with the face coat composition according to the first embodiment of the invention, the face coat composition of the second embodiment is advantageous in respect of the possibility of decreasing the firing temperature to give a face coat layer having a sufficiently high strength in addition to the advantage of a longer pot life of the composition to afford better workability in the preparation of the casting mold by using the face coat composition. The above mentioned decrease in the firing temperature of the casting mold leads to a possibility of using a relatively inexpensive refractory material for the backup coat layer of the mold because the procedure for the formation of the backup coat layer and thereafter can be conventional.

In the third embodiment of the inventive face coat composition, the aqueous emulsion of a synthetic resin as a binder in the above described second embodiment is replaced with a water-soluble organic polymer. Examples of the water-soluble organic polymer include polyhydroxy organic polymers such as polyethyleneglycols, polyvinyl alcohols and the like, cellulose derivatives such as methyl cellulose, ethyl cellulose, hydroxyalkyl celluloses, carboxymethyl cellulose and the like, polysaccharides such as dextrin, gum arabic, carrageenan and the like, water-soluble salts and amides of polycarboxylic acids such as sodium alginate, ammonium alginate, alginic acid amide, poly(sodium acrylate), poly(ammonium acrylate), poly(sodium methacrylate) and the like, and so on. These water-soluble polymeric compounds can be used either singly or as a combination of two kinds or more according to need.

Though not particularly limitative, the amount of the water-soluble polymeric compounds in the inventive face coat composition is, when a polyhydroxy polymer or a polysaccharide is used as the water-soluble polymer, in the range from 0.1 to 10 parts by weight per 100 parts by weight of the rare earth oxide powder in view of the binding effect to be exhibited thereby and the strength of the face coat layer after firing. Further, the amount of a polyhydroxy polymer or a polysaccharide as the water-soluble polymer in the face coat composition is in the range from 0.1 to 9% by weight based on the total amount of the face coat composition including water so as to impart the slurried composition with good rheological properties and appropriate viscosity suitable for the formation of a face coat layer of the mold having an appropriate thickness.

When the water-soluble polymeric compound is a salt or amide of a polycarboxylic acid, the amount thereof should be in the range from 0.1 to 5 parts by weight per 100 parts by weight of the rare earth oxide powder and in the range from 0.1 to 4.5% by weight based on the total amount of the face coat composition including water for the same reasons as above.

The face coat composition according to the third embodiment of the invention can be prepared, for example, by first dissolving the water-soluble polymeric compound in water to give a solution of a specified concentration and the powders of the rare earth oxide and rare earth glass are introduced portion-wise into the polymer solution under agitation or by adding the polymer solution to a blend of the powders with agitation to give an aqueous slurry of a specified solid content, which is then thoroughly milled in a ball mill or machine mortar until aggregates of the particles can no longer be found in the slurry. Similarly to the first embodiment, it is optional that the slurry under milling is admixed with a defoaming agent in order to prevent inclusion of air bubbles.

In the fourth embodiment of the inventive face coat composition, an aqueous emulsion of a synthetic resin and a water-soluble organic polymer are used in combination as the binder for the rare earth oxide powder and the rare earth glass powder. The types, the amount of the aqueous emulsion and the amount of the synthetic resin in the form of an aqueous emulsion can be about the same as in the face coat composition according to the second embodiment of the invention and the types and the amount of the water-soluble organic polymer can be about the same as in the face coat composition according to the third embodiment of the invention.

The face coat composition according to the fourth embodiment of the invention can be prepared, for example, by dissolving the water-soluble organic polymer in water to give an aqueous solution of the polymer in a specified concentration, which is then admixed with a specified amount of the aqueous emulsion of a synthetic resin with agitation followed by portion-wise introduction of the rare earth oxide powder and the rare earth glass powder thereinto under continued agitation to give an aqueous slurry of a specified solid content which is thoroughly milled in a ball mill or a machine mortar until aggregates of the particles can no longer be found therein.

In the fifth embodiment of the present invention, the face coat composition is formulated by using an aqueous or alcoholic sol of an inorganic oxide such as silicon dioxide, zirconium oxide and yttrium oxide as a binder in place of the aqueous emulsion of a synthetic resin for the rare earth oxide powder and the rare earth glass powder. The sol of the inorganic oxide can be either aqueous or alcoholic without particular limitations but the solid content in the sol is preferably in the range from 15 to 30% by weight. The sol is also not particularly limitative in respect of the particle size distribution of the oxide particles forming the sol and the value of pH when the sol is aqueous. The silicon dioxide sol can be a partial hydrolysis product of an alkyl orthosilicate such as ethyl silicate and the zirconium oxide sol can be a partial hydrolysis product of zirconyl acetate and the like. Commercial products of these inorganic oxide sols are available on the market and can be used as such for the purpose.

The amount of the inorganic oxide sol in the inventive face coat composition is not particularly limitative but preferably in the range from 20 to 50 parts by weight as the sol per 100 parts by weight of the rare earth oxide powder when it is desired to have the effect as a binder exhibited thereby and to obtain an adequate density of the face coat layer after firing of the mold as well as in consideration of the possible formation of a reaction-hardened layer on the surface of the cast body prepared by using the casting mold. When the amount of the inorganic oxide sol is in the above mentioned range, the face coat composition would have adequate theological properties including viscosity so as to facilitate formation of a face coat layer of the casting mold having an appropriate thickness. The net content of the inorganic oxide in the liquid sol thereof should be in the range from 3 to 15 parts by weight per 100 parts by weight of the rare earth oxide powder.

The face coat composition according to the fifth embodiment of the invention can be prepared, for example, by the portion-wise introduction of the rare earth oxide powder and the rare earth glass powder into an aqueous or alcoholic sol of an inorganic oxide having an adequate solid content by diluting a commercially available aqueous or alcoholic sol with water or alcohol, respectively, to give an aqueous or alcoholic slurry having a specified solid content which is then thoroughly milled in a ball mill or a machine mortar until aggregates of the particles can no longer be found in the slurry. It is optional according to need to add a defoaming agent into the slurry under milling in order to prevent inclusion of air bubbles in the slurried composition. The face coat composition according to the fifth embodiment of the invention is particularly advantageous in respect of the high strength of the casting mold after firing.

In the face coat composition according to the sixth embodiment of the invention, the binder for the rare earth oxide powder and the rare earth glass powder is a combination of the aqueous or alcoholic sol of an inorganic oxide such as silicon dioxide, zirconium oxide and yttrium oxide with an aqueous emulsion of a synthetic resin and/or a water-soluble organic polymer. The types, compounding amount of the aqueous emulsion and amount of the synthetic resin therein can be about the same as in the second embodiment and the types and the amount of the water-soluble organic polymer can be about the same as in the third embodiment. Further, the types, solid content and amount of compounding of the inorganic oxide sol in the face coat composition can be about the same as in the fifth embodiment of the invention.

The face coat composition of the sixth embodiment of the invention can be prepared, for example, by the portion-wise introduction of a rare earth oxide powder and a rare earth glass powder into a dispersion medium prepared by mixing an aqueous solution of a water-soluble organic polymer in a specified concentration with an aqueous or alcoholic sol of an inorganic oxide having an adequately adjusted solid content by diluting a commercially available aqueous or alcoholic sol of the inorganic oxide with water or alcohol, respectively, to give a slurry of a specified solid content which is then thoroughly milled in a ball mill or a machine mortar until aggregates of the particles can no longer be found in the slurry.

As compared with the face coat composition according to the first embodiment of the invention, those according to the second to the sixth embodiments of the invention are advantageous in respect of the increased strength of the face coat layer prepared therefrom, presumably, for the reasons described below.

The characteristic feature in the face coat compositions according to the second to the sixth embodiments of the invention as compared with that of the first embodiment is that the compositions of the second to the sixth embodiments contain a rare earth glass powder of a low melting point in combination with a rare earth oxide powder while the composition of the first embodiment contains a rare earth oxide powder alone as the refractory powder ingredient. Namely, the casting mold having a face coat layer prepared from the face coat compositions of the second to the sixth embodiments has a greatly increased strength after firing of the mold at a temperature in the range from 800° to 1300° C. as compared with that prepared from the face coat composition according to the first embodiment by virtue of the combined use of the rare earth glass powder.

For example, 100 parts by weight of a yttrium oxide powder was admixed with a varied amount of a rare earth glass powder having a chemical composition consisting of 10% by moles of erbium oxide, 40% by moles of magnesium oxide and 50% by moles of boron oxide in the range from 0.1 to 20 parts by weight and the powder mixture was compression-molded under a pressure of 250 kgflcm2 into pellets having a diameter of 20 mm and a height of 6 mm which were subjected to a heat treatment at 1100° C. for 3 hours in an electric furnace followed by spontaneous cooling in the furnace and measurement of the compressive strength to give the results graphically shown in FIG. 1 of the accompanying drawing as a function of the amount of the rare earth glass powder. As is clear from this graph, the compressive strength of the heattreated pellets is greatly increased by more than twice by the admixture of the rare earth glass powder as compared with the value obtained for the pellets prepared from the yttrium oxide powder alone without admixture of the rare earth glass powder.

Further, a casting test of a melt of titanium metal was undertaken by using the molds of which a heat-treated disc of a powder mixture of a yttrium oxide powder and a rare earth glass powder as mentioned above and the cast bodies were examined for the occurrence of a reaction-hardened layer leading to a conclusion that a significant reaction took place between the titanium melt and the rare earth glass when the amount of the rare earth glass powder exceeded 15 parts by weight per 100 parts by weight of the yttrium oxide powder. In addition, an additional advantage can be obtained by the use of a rare earth glass powder as a sintering aid by virtue of the stability of the rare earth glass in water not to cause dissolution or decomposition in contrast to other low melting-point glass such as that having a chemical composition of the formula $CaO.BaO.B_2O_3$ from which boron oxide is leached out into water.

Following is a description of the procedure for the preparation of a lost-wax casting mold by using the above described face coat composition and for the casting procedure of a high meltingpoint metal to give a cast body.

A typical procedure for the formation of a face coat layer on a wax model is as follows.

In the first place, at least one model having the same form and size as the desired cast body is prepared from a wax and waxmade parts for the sprue and runner are bonded to the wax model to give a so-called "tree". The kind of the wax used here is not particularly limitative but the wax is preferably a paraffin-based one. In the next place, the thus prepared "tree" is dipped in the face coat composition of the invention and then pulled up therefrom so as to form a layer of the face coat composition on the surface of the wax model. When the layer of the face coat composition on the wax model is still wet, particles of a ceramic powder are evenly sprinkled over and deposited on the wet surface of the face coat layer as a stucco. The ceramic powder used as the stucco is not particularly limitative provided that the ceramic material is highly refractory but it is preferably a rare earth oxide powder which can be the same one as that used as an ingredient of the inventive face coat composition. If necessary, the steps of formation of the face coat layer and sprinkling of the stucco powder are repeated several times followed by drying so as to have a face coat layer having an increased thickness, for example, in the range from 0.1 to 5 mm.

The wax model provided with a face coat layer in the above described manner is then immersed in a backup coat composition which is a dispersion of colloidal silica, partial hydrolysis product of ethyl orthosilicate or slurried mixture containing fine particles of a ceramic material such as zircon flour or fused silica glass flour and ceramic particles of mullite, zircon and the like are evenly sprinkled over and deposited on the still wet surface of the model pulled up from the backup coat composition as a stucco. The above described procedure is repeated several times until a backup coat layer having a suitable thickness can be obtained followed by thorough drying of the layer.

The wax model provided with the face coat layer and the backup coat layer forming a shell on the wax model in the above described manner is heated at about 180° C. and the molten wax is discharged out of the mold, preferably, under pressurization. The mold freed from the wax is subjected to a firing heat treatment at a in the range from about 1000 to about 1100° C. for a length of time in the range from 1 to 10 hours to complete the mold. Separately, the metal to be cast such as titanium metal or a titanium-based alloy is melted in a non-oxidizing atmosphere and the melt is poured into the mold through the sprue and runner. After solidification of the melt inside the casting mold by cooling, the mold is broken and removed from the thus cast body from which the portions of the sprue and runner are removed to finish the cast body of the metal.

The mold prepared in the above described manner is quite satisfactory as a casting mold for various kinds of high melting-point metals such as titanium, titanium-based alloys, zirconium, zirconium-based alloys and the like. In the following, the face coat composition and the casting mold according to the invention are described in more detail by way of examples taking titanium-based alloys as the metallic material for casting, which, however, never limit the scope of the present invention in any way. The term of "parts" appearing in the following description always refers to "parts by weight".

EXAMPLE 1.

A slurried face coat composition according to the invention was prepared in the following manner. Thus, 100 parts of a yttrium oxide powder were taken into a ball mill together with 60 parts of an aqueous emulsion consisting of 3.0% by weight of finely divided polyethylene particles and 0.2% by weight of polyoxyethylene (10) nonylphenyl ether as an emulsifying agent, the balance being water, and 0.05 part of a defoaming agent (Pullonick L-61, a product by Asahi Denka Co.) and the mixture was thoroughly milled in the ball mill for 40 minutes to give an aqueous slurry. The yttrium oxide powder had a particle size distribution composed of 55% by weight, 20% by weight and 25% by weight of the fractions of particles having a particle diameter not exceeding 2 μm, in the range from 2 to 5 μm and 5 μm or larger, respectively. The solid content of the thus prepared slurried face coat composition was 63% by weight and the composition was stable and had good appearance.

A block-formed wax model having dimensions of 25 mm by 100 mm by 10 mm was prepared and immersed in the above prepared slurried face coat composition to form a coating layer of the slurry and, before the coating layer of the slurry became dried, coarse particles of yttrium oxide having an average particle diameter of 250 μm prepared by crushing a sintered body of yttrium oxide were sprinkled over and deposited on the still wet surface as a stucco followed by drying to form a face coat layer having a thickness of 1 min.

The wax model provided with the face coat layer in the above described manner was then provided with a backup coat layer in a conventional manner by repeating the steps of immersion in an aqueous slurry containing a colloidal silica flour and zircon flour and sprinkling of mullite particles as a stucco until the backup coat layer had a specified thickness of 6 to 10 mm. After complete drying of the coating layers, the wax model having the dual coating layers was heated in an autoclave at 180° C. and the molten wax was discharged therefrom to give a mold which was subjected to a firing treatment at 1100° C. for 60 minutes to give a test mold. A number of the test molds were prepared in the same manner as above.

A half in number of the thus prepared test casting molds were subjected to the visual inspection of the outer appearance of the face coat layer and the backup coat layer to a depth of about 1 mm from the surface as well as a cross section of the mold wall. The results were that no cracks were found on the surface of the face coat layer which was free from any voids or pits due to inclusion of air bubbles. The surface condition of the face coat layer after dewaxing by discharging the molten wax was also quite satisfactory.

The remaining half in number of the test casting molds were subjected to a vacuum casting test at a casting temperature of 1950° C. by pouring a melt obtained by melting a titanium alloy containing 6% by weight of aluminum and 4% by weight of vanadium, the balance being titanium, in an electron-beam melting furnace. After cooling and solidification of the melt in the mold, the mold was broken and removed to give an as-cast body of the alloy which was finished by grinding the surface using sand blast to give a finished cast body. The surface of this cast body, of which the surface roughness Rmax was 15 μm, was examined to count the number of inclusions and pinholes for which the mold was responsible. Further, it was found that the thickness of the reaction-hardened layer on the surface of the cast body was 50 μm as determined by measuring the hardness using a Vickers microhardness tester along the direction of the depth from the surface.

EXAMPLE 2.

The experimental procedure was just the same as in Example 1 described above except that the yttrium oxide powder had a particle size distribution composed of 85% by weight, 10% by weight and 5% by weight of the fractions of particles having a particle diameter not exceeding 2 μm, in the range from 2 to 5 μm and 5 μm or larger, respectively. The results of the test preparation of casting molds were that almost no cracks were found on the surface of the face coat layer which was free from voids or pits due to air bubbles. The condition of the face coat layer after dewaxing of the wax model was satisfactory. The cast body prepared by using the casting molds had a surface roughness Rmax of 15 μm and the depth of the reaction-hardened surface layer thereof was 50 μm.

EXAMPLE 3.

The experimental procedure was just the same as in Example 1 described above except that the yttrium oxide powder was replaced with the same amount of a cerium (IV) oxide powder having a particle size distribution composed of 85% by weight, 10% by weight and 5% by weight of the fractions of particles having a particle diameter not exceeding 2 μm, in the range from 2 to 5 μm and 5 μm or larger, respectively. The results of the test preparation of casting molds were that no cracks were found on the surface of the face coat layer which was free from voids or pits due to air bubbles. The condition of the face coat layer after dewaxing of the wax model was satisfactory. The cast body prepared by using the casting molds had a surface roughness Rmax of 15 μm and the depth of the reaction-hardened surface layer thereof was 50 μm.

EXAMPLE 4.

The experimental procedure was just the same as in Example 1 described above except that the yttrium oxide powder was replaced with the same amount of an erbium oxide powder having a particle size distribution composed of 85% by weight, 10% by weight and 5% by weight of the fractions of particles having a particle diameter not exceeding 2 μm, in the range from 2 to 5 μm and 5 μm or larger, respectively. The results of the test preparation of casting molds were that no cracks were found on the surface of the face coat layer which was free from voids or pits due to air bubbles. The condition of the face coat layer after dewaxing of the wax model was satisfactory. The cast body prepared by using the casting molds had a surface roughness Rmax of 15 μm and the depth of the reaction-hardened surface layer thereof was 50 μm.

EXAMPLE 5.

The experimental procedure was just the same as in Example 1 described above excepting replacement of 1.8 parts of the polyethylene-containing aqueous emulsion with 3.0 parts of another aqueous emulsion containing 3.5% by weight of a polymer of an acrylic acid ester instead of 3.0% by weight of polyethylene and 0.2% by weight of sodium lauryl sulfate instead of 0.2% by weight of the polyoxyethylene (10) nonylphenyl ether. The results of the test preparation of casting molds were that no cracks were found on the surface of the face coat layer which was free from voids or pits due to air bubbles. The condition of the face coat layer after dewaxing of the wax model was satisfactory. The cast body prepared by using the casting molds had a surface roughness Rmax of 15 μm and the depth of the reaction-hardened surface layer thereof was 50 μm.

EXAMPLE 6.

An aqueous slurry as a face coat composition was prepared by blending 100 parts of a yttrium oxide powder, 5 parts of a powder of rare earth glass consisting of 10% by moles of erbium oxide, 40% by moles of magnesium oxide and 50% by moles of boron oxide and 60 parts of an aqueous emulsion containing 3.0% by weight of polyethylene particles and thoroughly milling the mixture for 50 minutes in a ball mill. This aqueous slurry could be used as a face coat composition even after storage for 60 days at room temperature.

In the next place, a wax model having dimensions of 25 mm by 100 mm by 10 mm was immersed in the above prepared slurried composition and pulled up therefrom to form a coating layer of the composition on the surface followed by sprinkling of yttrium oxide particles having an average diameter of 250 μm over the still wet surface of the coating layer as a stucco to form a face coat layer on the wax model. Thereafter, a backup coat layer was formed on the face coat layer by 7 times repeating the cycles of dipping of the model in an aqueous slurry containing colloidal silica and zircon flour and drying.

After complete drying of the thus formed face coat layer and the backup coat layer thereon, the model was heated in an autoclave at 180° C. to discharge the molten wax out of the shell-formed casting mold followed by a firing treatment at 1100° C. to complete the casting mold. A melt of the same titanium alloy as used in the preceding examples was poured into the thus prepared casting mold at a casting temperature of 1950° C. in a vacuum atmosphere of $10^{-3}$ Torr followed by cooling to solidify the melt.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 7.

The experimental procedure was substantially the same as in Example 6 except that the amount of the rare earth glass powder was increased from 5 parts to 10 parts.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 8.

The experimental procedure was substantially the same as in Example 6 except that 5 parts of the erbium oxide-containing rare earth glass powder were replaced with 2 parts of a powder of another rare earth glass consisting of 10% by moles of yttrium oxide, 40% by moles of magnesium oxide and 50% by moles of boron oxide.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 9.

The experimental procedure was substantially the same as in Example 8 except that the amount of the rare earth glass powder was increased from 2 parts to 12 parts.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 10.

The experimental procedure was substantially the same as in Example 6 except that 5 parts of the erbium oxide-containing rare earth glass powder were replaced with 6 parts of a powder of third rare earth glass consisting of 10% by moles of gadolinium oxide, 40% by moles of zinc oxide and 50% by moles of boron oxide and replacement of the aqueous emulsion containing 3.0% by weight of polyethylene with the same amount of another aqueous emulsion containing 5.0% by weight of a polymer of an acrylic acid ester.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

Comparative Example 1.

The experimental procedure was substantially the same as in Example 6 excepting replacement of the yttrium oxide powder with the same amount of a zirconium oxide powder, omission of the rare earth glass powder and replacement of the aqueous polyethylene emulsion with 30 parts by weight of an aqueous zirconia sol containing 20% by weight of zirconium oxide.

The thus prepared cast body was finished and examined in the same manner as in the preceding examples to find that the condition of the surface was fairy good but with 3 to 9 defect points on each of the 100 mm by 25 mm surfaces and the depth of the reaction-hardened surface layer was 0.5 mm.

EXAMPLE 11.

The experimental procedure was substantially the same as in Example 6 excepting replacement of the polyethylene-containing aqueous emulsion with the same amount of a 1.5% by weight aqueous solution of methyl cellulose in the preparation of the face coat composition. The thus prepared slurried face coat composition was stable and could be used for forming a face coat layer even after storage for 60 days at room temperature.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 12.

The experimental procedure was substantially the same as in Example 11 except that the amount of the rare earth glass powder was increased from 5 parts to 10 parts.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 13.

The experimental procedure was substantially the same as in Example 11 except that 5 parts of the erbium oxide-containing rare earth glass powder were replaced with 2 parts of a powder of another rare earth glass consisting of 10% by moles of yttrium oxide, 40% by moles of magnesium oxide and 50% by moles of boron oxide.

The thus prepared cast body was finished and examined in the same manner as in the preceding examples to find that the condition of the surface was fairy good but with 3 to 9 defect points on each of the 100 mm by 25 mm surfaces and the depth of the reaction-hardened surface layer was 0.1 mm.

EXAMPLE 14.

The experimental procedure was substantially the same as in Example 13 except that the amount of the rare earth glass powder was increased from 2 parts to 12 parts.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 15.

The experimental procedure was substantially the same as in Example 11 except that 5 parts of the erbium oxide-containing rare earth glass powder were replaced with 6 parts of a powder of another rare earth glass consisting of 10% by moles of gadolinium oxide, 40% by moles of zinc oxide and 50% by moles of boron oxide and replacement of the aqueous emulsion containing 3.0% by weight of polyethylene particles with the same amount of another aqueous emulsion containing 5.0% by weight of a polymer of an acrylic acid ester.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

Comparative Example 2.

The experimental procedure was substantially the same as in Example 11 excepting omission of the rare earth glass powder.

The thus prepared cast body was finished and examined in the same manner as in the preceding examples to find that the condition of the surface was poor with 10 to 19 defect points on each of the 100 mm by 25 mm surfaces although the depth of the reactionhardened surface layer was 0.1 mm.

Comparative Example 3.

The experimental procedure was substantially the same as in Example 15 excepting omission of the rare earth glass powder.

The thus prepared cast body was finished and examined in the same manner as in the preceding examples to find that the condition of the surface was poor with 10 to 19 defect points on each of the 100 mm by 25 mm surfaces although the depth of the reactionhardened surface layer was 0.1 mm.

EXAMPLE 16.

The experimental procedure was substantially the same as in Example 11 except that the rare earth glass powder had a chemical composition consisting of 10% by moles of erbium oxide, 36% by moles of magnesium oxide, 4% by moles of lithium oxide and 50% by moles of boron oxide.

The cast body prepared by using the casting mold having the face coat layer of the above composition was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 17.

The experimental procedure was substantially the same as in Example 16 except that the amount of the rare earth glass powder was increased from 5 parts to 10 parts.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 18.

The experimental procedure was substantially the same as in Example 16 except that the amount of the rare earth glass powder was decreased from 5 parts to 2 parts.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 19.

The experimental procedure was substantially the same as in Example 16 except that the amount of the rare earth glass powder was increased from 5 parts to 12 parts.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 20.

The experimental procedure was substantially the same as in Example 16 excepting replacement of 5 parts of the erbium oxide-containing rare earth glass powder with 6 parts of a powder another rare earth glass consisting of 10% by moles of gadolinium oxide, 36% by moles of zinc oxide, 4% by moles of lithium oxide and 50% by moles of boron oxide and replacement of the 1.5% by weight of the aqueous solution of methyl cellulose with the same amount of a 3.0% by weight aqueous solution of polyvinyl alcohol.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 21.

The experimental procedure was substantially the same as in Example 6 except that 60 parts of the polyethylene-containing emulsion were replaced with the same amount of another emulsion containing 2.0% by weight of polyethylene particles as the emulsified phase and containing 1.0% by weight of methyl cellulose dissolved therein.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 1 mm.

EXAMPLE 22.

The experimental procedure was substantially the same as in Example 21 except that 60 parts of the methyl cellulose-containing polyethylene emulsion were replaced with the same amount of another emulsion containing 3.0% by weight of a polymer of an acrylic acid ester as the emulsified phase and containing 1.5% by weight of polyvinyl alcohol dissolved therein.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 23.

The experimental procedure was substantially the same as in Example 21 except that 60 parts of the methyl cellulose-containing polyethylene emulsion were replaced with 40 parts by weight an aqueous silica sol containing 20% by weight of silicon dioxide.

The thus prepared cast body was finished and examined in the same manner as in the preceding examples to find that the condition of the surface was fairly good but with 3 to 9 defect points on each of the 100 mm by 25 mm surfaces and the depth of the reaction-hardened surface layer was 0.3 mm.

EXAMPLE 24.

The experimental procedure was substantially the same as in Example 21 except that 60 parts of the methyl cellulose-containing polyethylene emulsion were replaced with 35 parts by weight of an aqueous zirconia sol containing 27% by weight of zirconium oxide.

The thus prepared cast body was finished and examined in the same manner as in the preceding examples to find that the condition of the surface was quite satisfactory with less than 3 defect points on each of the 100 mm by 25 mm surfaces but the depth of the reaction-hardened surface layer was 0.2 mm.

EXAMPLE 25.

The experimental procedure was substantially the same as in Example 23 except that 40 parts of the aqueous silica sol were replaced with 50 parts of an aqueous yttrium oxide sol containing 20% by weight of yttrium oxide.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 26.

The experimental procedure was substantially the same as in Example 23 except that 40 parts of the aqueous silica sol were replaced with 40 parts of another aqueous silica sol containing 20% 10% by weight of silicon dioxide as the dispersed phase and containing 1% by weight of methyl cellulose dissolved therein.

The thus prepared cast body was finished and examined in the same manner as in the preceding examples to find that the condition of the surface was quite satisfactory with less than 3 defect points on each of the 100 mm by 25 mm surfaces but the depth of the reaction-hardened surface layer was 0.2 mm.

EXAMPLE 27.

The experimental procedure was substantially the same as in Example 23 except that 40 parts of the aqueous silica sol were replaced with 35 parts of an aqueous zirconia sol containing 20% by weight of zirconium oxide as the dispersed phase and containing 3.0% by weight of a polymer of an acrylic acid ester as the emulsified phase.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

EXAMPLE 28.

The experimental procedure was substantially the same as in Example 23 except that 40 parts of the aqueous silica sol were replaced with 35 parts of an aqueous zirconia sol containing 20% by weight of zirconium oxide as the dispersed phase, 3.0% by weight of a polymer of an acrylic acid ester as the emulsified phase and 1.5 % by weight of polyvinyl alcohol dissolved therein.

The thus prepared cast body was finished and examined in the same manner as in the preceding examples to find that the condition of the surface was quite satisfactory with less than 3 defect points on each of the 100 mm by 25 mm surfaces and the depth of the reaction-hardened surface layer was 0.1 mm.

What is claimed is:

1. A face coat composition for a casting mold in the form of a slurry which comprises a rare earth oxide powder and a rare earth glass powder dispersed in a liquid medium containing a binder agent, the amount of the rare earth glass powder being in the range from 1 to 15 parts by weight per 100 parts by weight of the rare earth oxide powder.

2. The face coat composition for a casting mold as claimed in claim 1 in which the rare earth glass has a chemical composition represented by the formula

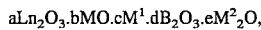

in which Ln is a rare earth element, M is a divalent element selected from the group consisting of magnesium, calcium, strontium, barium and zinc, $M^1$ is an inorganic oxide selected from the group consisting of aluminum oxide, silicon dioxide and antimony oxide, $M^2$ is an alkali metal element selected from the group consisting of lithium, sodium and potassium, the subscript a is a positive number in the range from 0.01 to 0.30, the subscript b is 0 or a positive number not exceeding 0.60, the subscript c is 0 or a positive number not exceeding 0.20, the subscript d is a positive number in the range from 0.30 to 0.80 and the subscript e is 0 or a positive number not exceeding 0.15 with the proviso that a+b+c+d+e= 1 and b+c does not exceed 0.60.

3. The face coat composition for a casting mold as claimed in claim 1 in which the liquid medium is an aqueous emulsion of a synthetic resin dispersed therein as the binder agent, the amount of the synthetic resin being in the range from 0.1 to 10 parts by weight per 100 parts by weight of the rare earth oxide powder.

4. The face coat composition for a casting mold as claimed in claim 1 in which the liquid medium is an aqueous solution of a water-soluble organic polymer therein as the binder agent, the amount of the water-soluble organic polymer in the aqueous solution being in the range from 0.1 to 10 parts by weight per 100 parts by weight of the rare earth oxide powder.

5. The face coat composition for a casting mold as claimed in claim 1 in which the liquid medium is an aqueous emulsion of a synthetic resin dispersed therein and a water-soluble organic polymer dissolved therein, the amounts of the synthetic resin and the water-soluble organic polymer each being in the range from 0.1 to 10 parts by weight per 100 parts by weight of the rare earth oxide powder.

6. The face coat composition for a casting mold as claimed in claim 1 in which the liquid medium is a liquid sol of an inorganic oxide selected from the group consisting of silicon dioxide, zirconium oxide and yttrium oxide, the amount of the inorganic oxide being in the range from 3 to 15 parts by weight per 100 parts by weight of the rare earth oxide powder.

7. The face coat composition as claimed in claim 6 which further comprises an organic polymer as a binder agent.

8. The face coat composition as claimed in claim 7 in which the organic polymer is a water-insoluble synthetic resin in the form of an aqueous emulsion, a water-soluble organic polymer dissolved in the liquid medium or a combination thereof, the amount of the organic polymer being in the range from 0.1 to 10 parts by weight per 100 parts by weight of the rare earth oxide powder.

9. The face coat composition as claimed in claim 1 in which the rare earth oxide powder has such a particle size distribution that the weight fraction of particles having a particle diameter not exceeding 2 μm is in the range from 30% to 100%.

10. The face coat composition as claimed in claim 9 in which the rare earth oxide powder has such a particle size distribution that the weight fractions of particles having a particle diameter not exceeding 2 μm, in the range from 2 to 5 μm and exceeding 5 μm are in the ranges from 50 to 90%, from 0 to 40% and from 10 to 50%, respectively.

* * * * *